(12) United States Patent
Otsuka

(10) Patent No.: US 7,547,485 B2
(45) Date of Patent: Jun. 16, 2009

(54) POWER GENERATION UNIT AND FUEL CELL

(75) Inventor: Kazuhiko Otsuka, Saitama (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 11/048,796

(22) Filed: Feb. 3, 2005

(65) Prior Publication Data

US 2005/0191540 A1 Sep. 1, 2005

(30) Foreign Application Priority Data

Feb. 27, 2004 (JP) ............................. 2004-052873

(51) Int. Cl.
- *H01M 2/14* (2006.01)
- *H01M 2/00* (2006.01)
- *H01M 2/02* (2006.01)
- *H01M 8/24* (2006.01)

(52) U.S. Cl. ............................. 429/38; 429/39; 429/34; 429/10; 429/17

(58) Field of Classification Search .................. 429/10, 429/17, 34, 38, 39
See application file for complete search history.

(56) References Cited

U.S. PATENT DOCUMENTS 4,296,184 A * 10/1981 Stachurski .................. 429/14
6,558,825 B1 * 5/2003 Faris et al. .................. 429/17
2004/0253497 A1 * 12/2004 Raiser ........................ 429/32

FOREIGN PATENT DOCUMENTS

WO WO 0197317 A1 * 12/2001

* cited by examiner

*Primary Examiner*—Patrick Ryan
*Assistant Examiner*—Eugenia Wang
(74) *Attorney, Agent, or Firm*—Oblon, Spivak, McClelland, Maier & Neustadt, P.C.

(57) ABSTRACT

The present invention is to provide a power generation unit successful in equalizing flow rates of fluids flowing through individual flow paths of a power generation cell, and is to provide a fuel cell which can flexibly be adapted to required power generation capacity, geometry. The power generation unit of the present invention comprises a power generation cell which is composed of a joint component of a pair of electrodes and an electrolyte component held between the electrodes, and a flow path forming component having a flow path allowing a fluid supplied to the joint component to flow therethrough; and a fluid conveyance apparatus having an opening commonly functioning as an intake port and a discharge port of the fluid. This enables equalizing of the flow rates of the fluid flowing in the flow path, resulting in equalization of flow rates of the fluids flowing through the individual flow paths.

12 Claims, 9 Drawing Sheets

POWER GENERATION UNIT AND FUEL CELL

CROSS REFERENCES TO RELATED APPLICATIONS

The present document is based on Japanese Priority Document JP 2004-052873, filed in the Japanese Patent Office on Feb. 27, 2004, the entire contents of which being incorporated herein by reference.

BACKGROUND OF THE INVENTION

1. Field of the Invention

The present invention relates to a power generation unit, and a fuel cell having the power generation unit mounted thereon.

2. Description of Related Art

A fuel cell is a power generation element which generates electric power by allowing a fuel gas, such as hydrogen gas, and an oxidant gas, such as oxygen gas, to electrochemically react. The fuel cell has been attracting a public attention as an environmentally-clean power generation element, because water is an only product of the power generation, so that efforts have been made typically on its use as a drive power source for driving automobiles.

The fuel cell can be classified by electrolyte into various types, wherein a representative type is known as a fuel cell using a solid polymer electrolyte as the electrolyte. The polymer electrolyte fuel cell can be reduced in costs, easy to downsize, easy to thin, and easy to reduce in weight, and is also advantageous in cell performance by virtue of its high output energy density, so that it is promising as a drive power source for notebook personal computer, mobile phone, and portable electronic appliances such as PDA. There is also a proposal on a stacked cell type fuel cell configured by alternately stacking a plurality of power generation cells and flow path forming components.

As one example of a conventional stacked cell type fuel cell, there is known a fuel cell as shown in FIG. 12, configured by alternately stacking, on a base plate 922, an electrode-electrolyte joint component 920, in which an electrolyte film and electrodes are integrated, and a flow path forming plat plate component 921 having a flow path for a fuel gas on one surface thereof and that for an oxidant gas on the other surface thereof, then by placing a fastening flat plate 93 on the topmost thereof, and by fastening them using fastening bolts penetrating them in the direction of stacking. The electrolyte film and the electrodes have a catalyst layer held in between, so as to allow a power generation reaction to proceed at the interface between the catalyst layer and electrolyte film.

In the power generation by thus-configured, stacked cell type fuel cell, it is necessary to supply the oxidant gas such as air to the flow path for the oxidant gas. The air supply to the oxidant gas flow path relying upon the natural convection within the cell is, however, unsuccessful in stably supplying the air. In other words, this results in lowering in the power generation efficiency. In order to stably supply the air to the flow path, there is adopted a method of supplying the air to the flow path by forcedly creating an air flow within the cell using an air-supply fan provided in the fuel cell.

As one example, there is known a fuel cell having a housing equipped with an air supply fan, disposed at the opening portion of the oxidant gas flow path of the stacked cell type fuel cell. (See Patent Document 1, for example.)

[Patent Document 1]
Japanese Patent Application Publication (KOKAI) No. 2001-015136

SUMMARY OF THE INVENTION

For a case where the aforementioned air-supply fan is used, it is necessary to fabricate the fan equipped to the housing in a size fitting to the fuel cell. In other words, a small fuel cell needs fabrication and attachment of a small fan. Downsizing of the fan, however, increases an occupational ratio of the motor provided at the center portion of the housing, and this undesirably reduces a blast sectional area, and may consequently lower blasting capacity more than as being expected from the decrease in the vertical and lateral dimensions of the fan.

In order to ensure an effective power generation of the fuel cell, it is also necessary to ensure uniformity in the air flow rate in the individual flow paths of the fuel cell. For a case where the fan is attached to every fuel cell as described in Patent Document 1, it is necessary to fabricate an optimum fan capable of ensuring uniformity in the air flow rate in the individual flow paths in the fuel cell, each time the size or geometry of the fuel cell is modified.

The present invention is to provide a power generation unit successful in equalizing flow rates of fluids flowing through individual flow paths of a power generation cell, and is to provide a fuel cell which can flexibly be adapted to required power generation capacity, geometry and so forth.

A power generation unit of the present invention comprises a power generation cell which is composed of a joint component of a pair of electrodes and an electrolyte component held between the electrodes, and a flow path forming component allowing a fluid supplied to the joint component to flow therethrough; and a fluid conveyance unit having an opening commonly functioning as an intake port and a discharge port of the fluid, and discharging the fluid into the flow path.

Because flow rates of the fluid discharged from the individual openings of the fluid conveyance unit are equal in the power generation unit of the present invention, also flow rates of the fluid flowing through the individual flow paths of the power generation cell become equal. Mounting of-the fluid conveyance unit on the power generation unit is, therefore, successful in equalizing the flow rates of the fluid in the individual flow paths, and this ensures an effective power generation. The fluid conveyance unit is capable of discharging the fluid excellent in the flow rate and linearity, so that it can stably supply the fluid even through, for example, a narrow flow path having a large air flow resistance. This makes it possible to stably supply the fluid through the flow path thinned as a result of the downsizing and thinning of the flow path forming component, and thereby makes it possible to downsize and thin the power generation unit.

A fuel cell of the present invention has a power generation unit which comprises a joint component of a power generation cell which is composed of a pair of electrodes and an electrolyte held between the electrodes, and a flow path forming component allowing a fluid supplied to the joint component to flow therethrough; and a fluid conveyance unit having an opening commonly functioning as an intake port and a discharge port of the fluid, and discharging the fluid into the flow path.

According to the fuel cell of the present invention, since flow rates of the fluid flowing through the individual flow paths of the power generation unit is uniform, the fuel cell composed of the power generation unit has equal flow rates of the fluid flowing through the individual flow paths so that an effective power generation can be ensured. Even in a case where the number of units to be arranged in accordance with power generation capacity, geometry, size required for a fuel cell, it is possible to easily construct the fuel cell.

BRIEF DESCRIPTION OF THE DRAWINGS

FIG. 3A is a plan view of the pressure plate and FIG. 3B is a cross-sectional view taken along a longitudinal direction thereof;

FIG. 4A is a perspective view showing the configuration of the apparatus and FIG. 4B is a cross-sectional view taken along a line IV-IV;

FIG. 6A is a view showing a bottom surface inside a housing in a case of using magnets having an inverse polarity with each other, FIG. 6B is a cross-sectional view of the fluid conveyance apparatus in the case of using the magnets having an inverse polarity with each other, FIG. 6C is a view showing a bottom surface inside the housing in a case of using a single magnet.

PREFERRED EMBODIMENTS OF THE INVENTION

The following paragraphs will describe in detail a power generation unit, and a fuel cell comprising the power generation unit of the present invention, referring to the attached drawings. It is to be understood that the present invention is by no means limited to the following description, and allows any proper modifications without departing from the spirit of the invention.

Figure 1:
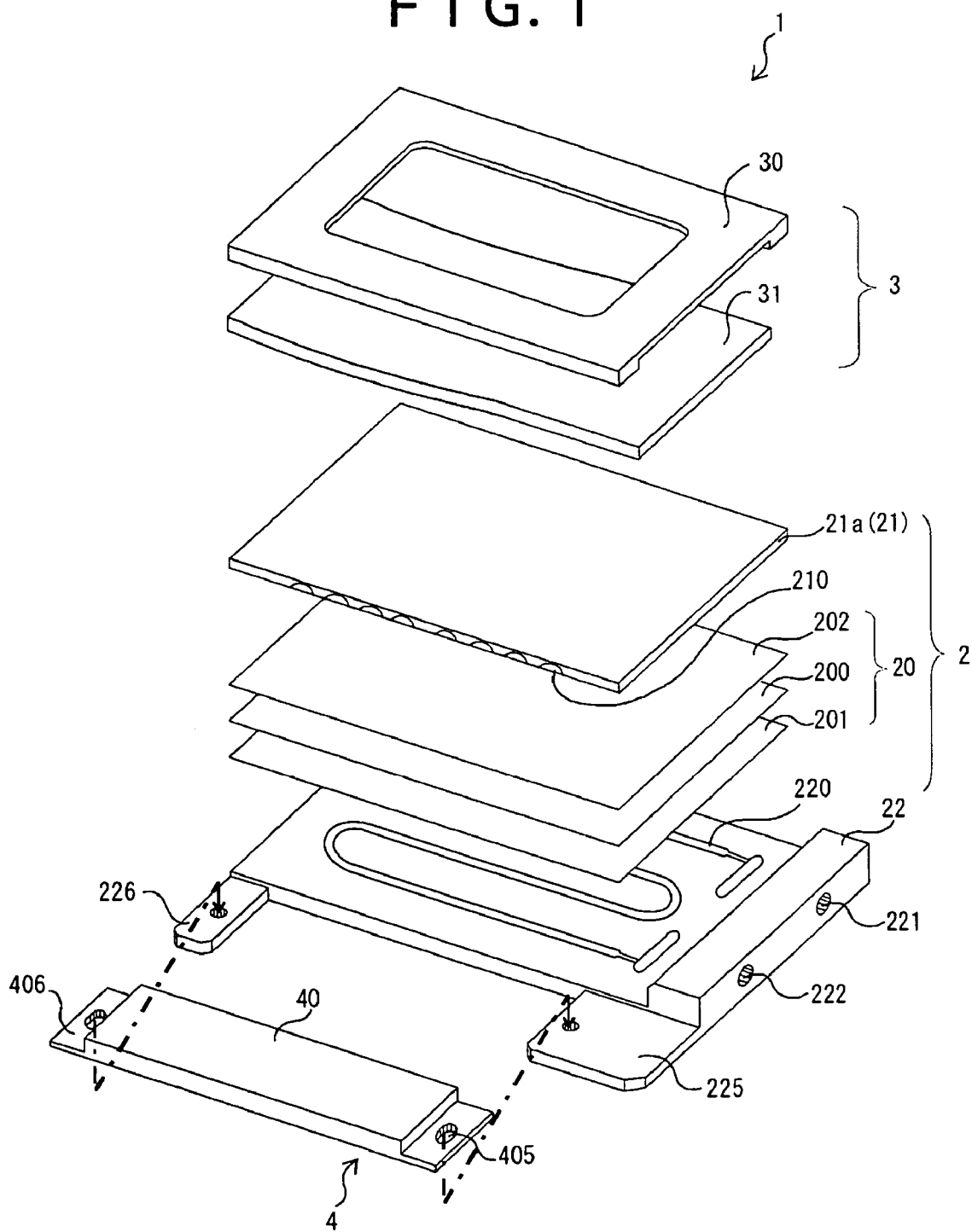
FIG. 1 is an exploded perspective view showing components composing a power generation unit of the present invention.

FIG. 1 shows an exploded perspective view showing components composing the power generation unit of the present invention. The power generation unit 1 of the present invention is configured as having a power generation cell 2, a fastening unit 3 and a fluid conveyance unit 4. In the power generation cell 2, a joint component 20, having an electrolyte 200 sandwiched between electrodes 201, 202, is held between a flow path forming component 21 having oxidant gas flow paths 210 allowing the air to flow therethrough and a base 22 having a fuel gas flow path 220 allowing hydrogen gas to flow therethrough. The fastening unit 3 is comprised of a frame 30 holding the power generation cell 2 and a pressure plate attached to the frame. The fluid conveyance unit 4 is comprised of a housing 40 having openings 401 and a diaphragm 41 partitioning the housing 40 into two spaces.

In the present invention, the number of cells of the power generation cell 2 is equal to the number of the joint components 20 placed between the oxidant gas flow paths 210 and the fuel gas flow path 220. In addition, in the present invention, the number of units of the power generation unit 1 is defined by the number of sets assuming that one set is composed of the power generation cell 2, the fastening unit 3 and the fluid conveyance unit 4 stacked on the base 22.

The joint component 20 comprises the near-rectangular electrolyte 200 allowing proton to pass therethrough, and the electrodes 201 and 202 having a catalyst which acts in the power generation reaction, and is formed by placing the electrolyte 200 between the electrode 201 and electrode 202, and by allowing them to bond. The electrolyte 200 allowing proton to pass therethrough is formed using a material having all of permeability, anti-oxidative property and heat resistance, wherein examples of the material can be exemplified by solid polymers such as perfluorosulfonate polymer. The electrodes 201, 202 are composed of a metal material, carbon material or non-woven fabric of electro-conductive, wherein the carbon material used herein may have a catalyst such as platinum supported on the porous surface thereof. It is also allowable to dispose a diffusion layer such as being composed of a carbon paper or the like, having both of gas permeability and electro-conductivity, on the contact surfaces of the electrodes 201, 202 of the joint component 20 with the separator 21 and the base 22, respectively. Size and geometry of the electrolyte 200, the electrode 201 and the electrode 202 may appropriately be modified corresponding to size and geometry of the later-described, flow-path-forming component 21, or size and geometry of the power generation cell 2.

The flow-path-forming component 21 can be classified depending on the flow path to be provided, into a flow-path-forming component 21a and a flow-path-forming component 21b. The flow-path-forming component 21a is composed of a near-rectangular solid flat plate, and has oxidant gas flow paths 210 on the surface thereof in contact with the joint component 20. The flow-path-forming component 21b is composed of a plate having an almost same geometry with the flow-path-forming component 21a, and has oxidant gas flow paths 210 formed on one surface thereof in contact with the joint component 20, and has a fuel gas flow path 220 formed on the surface thereof opposite to that having the oxidant gas flow path 210 formed thereon. Material used for the flow-path-forming component 21 may be anything so far as it is excellent in electro-conductivity, and in air-tightness enough to prevent mixing of hydrogen and air. For a case where a plurality of the joint component components 20 are stacked, the flow-path-forming component 21b is disposed so as to oppose the oxidant gas flow paths 210 and the fuel gas flow path 220, while placing each joint component 20 in between.

Figure 2:
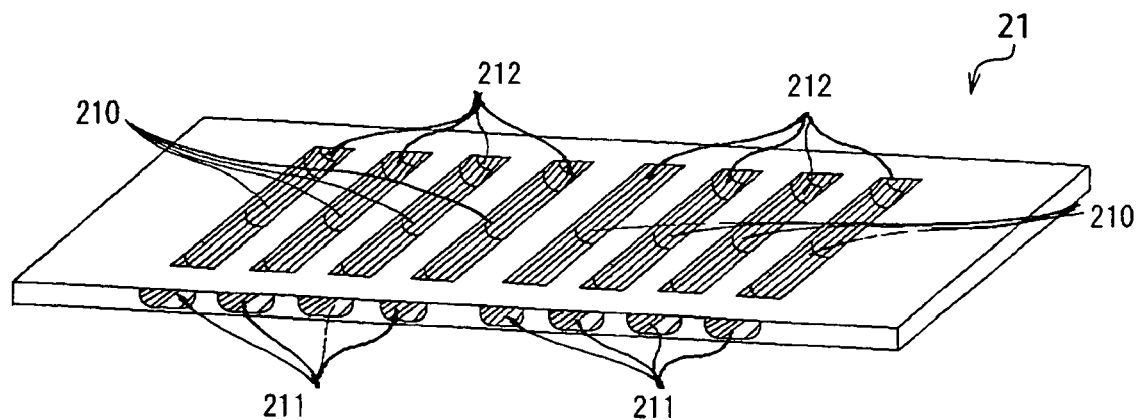
FIG. 2 is a perspective view of a flow path forming component showing geometry of an oxidant gas flow path.

The oxidant gas flow paths 210 are formed in plurality in the flow-path-forming component 21 as shown in FIG. 2, wherein each of which has an opening portion 211 opened in the side face of the flow-path-forming component 21, and similarly has an opening portion 212 opened also on the side face opposite to the side face having the opening portion 211 opened therein. Geometry of the oxidant gas flow path 210 is such as having a halved-oval section with rounded corners, and such as being tapered so that the sectional area of the oxidant gas flow path 210 is widened from the center portion of the oxidant gas flow path 210 towards the opening portion 211 and the opening portion 212. The geometry of the oxidant gas flow path 210 is successful in reducing the air flow resistance. The oxidant gas flow path 210 is designed so as to be adapted to required power generation capacity.

The nearly-flat-plate-formed base 22 has, as shown in FIG. 1, an outside dimension larger than those of the joint component 20, the flow-path-forming component 21, and the fastening unit 3 explained below, and has the fuel gas flow path 220 on the surface thereof in contact with the joint component 20. The base 22 has fixtures 225, 226 used for mounting the fluid conveyance unit 4, described later, provided so as to thrust out from the portion in contact with the joint component 20. The base 22 also has a fuel gas supply port 221 supplying the fuel gas, and a fuel gas discharge port 222 discharging the fuel gas, opened in the end face adjacent to the surface having the fuel gas flow path 220 formed thereon, and also adjacent to the surface having the fixtures 225, 226 provided thereto. The base 22 is composed of a material having a rigidity enough to be not readily deformed under fastening using the fastening unit 3, and having electro-conductivity enough to allow it to function as an anode current collector plate.

The fuel gas flow path 220 is designed so as to wind on the surface, in contact with the joint component 20, of the base 22, and connected to the fuel gas supply port 221 and the fuel gas discharge port 222 provided on the end face of the base 22. Also a flow path having a geometry similar to that of the fuel gas flow path 220 is provided to the flow-path-forming component 21b on the surface thereof opposite to that having the oxidant gas flow paths 210 formed thereon. The fuel gas flow path 220 of the flow-path-forming component 21b is connected to the fuel gas supply port 221 and the discharge port 222 provided to the base 22, by stacking the flow-path-forming component 21b on the base 22 while placing the joint component 20 in between. By supplying hydrogen through the fuel gas supply port 221 typically using a hydrogen absorption cartridge, not shown, hydrogen is supplied over the entire range of the fuel gas flow path 220, and is then discharged from the fuel gas discharge port 222. The fuel gas flow path 220, the fuel gas supply port 221, and the fuel gas discharge port 222 are designed so as to be adapted to required power generation capacity.

The power generation cell 2 is, as shown in FIG. 1, is stacked so that the joint component 20 is held between the surface of the flow-path-forming component 21a having the oxidant gas flow paths 210 formed thereon, and the surface of the base 22 having the fuel gas flow path 220 formed thereon. Although the number of cells is one in the exemplary case shown in FIG. 1, the number of cells may be two or more, depending on required voltage. For example, in the stack of the power generation cells 2 of this case, the flow-path-forming components 21b are stacked so as to oppose the fuel gas flow path 220 of the base 22 and the oxidant gas flow paths 210 of the flow-path-forming component 21b, while placing the joint component 20 in between, and the flow-path-forming component 21a is then stacked thereon so as to oppose the fuel gas flow path 220 of the flow-path-forming component 21b, which resides on the topmost surface of thus-stacked plurality of flow-path-forming component 21b, with the oxidant gas flow paths 210 of the flow-path-forming component 21a.

By forming the power generation cell 2 as described in the above, and by supplying hydrogen to the fuel gas supply port 221 from the external typically using a hydrogen absorption cartridge, not shown, hydrogen is supplied to the fuel gas flow path 220, and is then discharged from the fuel gas discharge port 222. The power generation cell 2 also has a seal component keeping the air-tightness disposed thereon, so as to ensure a structure capable of preventing hydrogen from leaking from the fuel gas flow path 220. On the other hand, since the oxidant gas flow paths 210 have the openings on the side faces of the flow-path-forming component 21, it is possible to supply the air to the oxidant gas flow paths 210 by providing the fluid conveyance unit 4 described later onto the base 22.

The fastening unit 3 is disposed on the opposite side of the base 22 while placing the power generation cell 2 in between, and comprises the frame 30 holding the power generation cell 2, and the pressure plate 31 attached to the frame 30 so as to press the power generation cell 2. The frame 30 is a frame-formed flat plate, and is composed of a material having a rigidity enough to be not readily deformed under fastening of the power generation cell 2. It is also allowable to provide a groove corresponded to the geometry of the pressure plate 31, on the surface of the frame 30 having the pressure plate 31 attached thereto. Depth of the groove may be set equal to thickness of the pressure plate 31. By providing this sort of groove, the pressure plate 31 attached to the groove is pressurized when the frame 30 is attached to the power generation cell 2, and the fastening under pressure can be effected collaboratively by the frame 30 and the pressure plate 31 forming a single flat plane. Selection of a frame-formed component as a member to which the pressure plate 31 is attached contributes to weight reduction of the fastening unit 3, and to thinning of the power generation unit 1 to a degree expected from the depth of the groove.

Figure 3A:
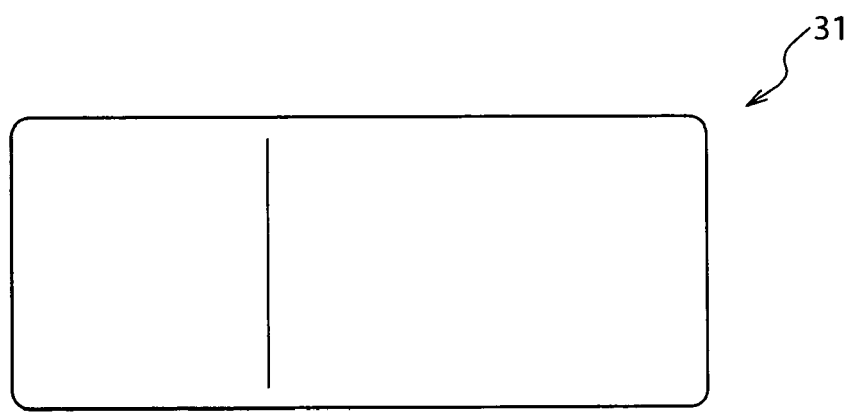
FIGS. 3A-3B show geometry of a pressure plate, where
Figure 3B:
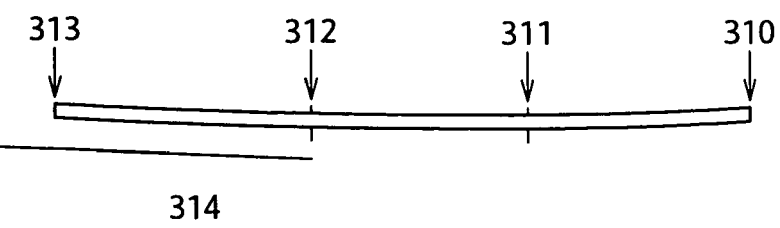

FIG. 3 is a drawing showing a geometry of the pressure plate 31. The pressure plate 31 is, as shown in FIG. 3A, composed of a single plate material, and has a cross-section taken along the longitudinal direction thereof, as shown in FIG. 3B. The shape of the cross-section taken along the longitudinal direction of the pressure plate 31 is expressed by combining a curved surface shape having a predetermined thickness, extending from an end point 310 via a pole point 311 to reach a node 312, with a straight line-like form having a predetermined thickness, extending from the node 312 to reach an end point 313, in parallel with a tangent line 314 at the node 312 of the curved surface, both components being connected at the node 312. The pressure plate 31 is composed of an electro-conductive material or a good heat conductor, and also a spring-making rolled material. The pressure plate 31 may typically be composed of a metal such as phosphor bronze or stainless steel, and may have an insulating material such as rubber coated on the surface thereof in contact with the frame 30. The pressure plate 31 is not limited to that having the geometry shown in FIG. 3, but may have any geometry allowing uniform pressurizing of the power generation cell 2 to be installed. It is, for example, allowable to use a pressure plate configured by stacking thin plates differing in the longitudinal size so as to thicken the center portion of the plate.

The electro-conductive material in the context of the present invention refers to a material having a low electric resistance, and more specifically, a material composed of copper, iron, aluminum, stainless steel, polyacetylene or the like. The good heat conductor in the context of the present invention refers to a material having a large heat conductivity, and more specifically, a material composed of iron, aluminum, copper, stainless steel, brass or the like.

The fastening unit 3, configured by attaching the pressure plate 31 to the frame 30, is provided on the top surface of the power generation cell 2. It can make the fastening force effective to the power generation cell 2 through use of fastening bolt or the like. The pressure plate 31 provided to the power generation cell 2 is pressurized on the curved portion thereof by the force exerted from the frame 30 towards the power generation cell 2, and forms a flat surface. At the same time, the pressure plate 31 produces a force recovering the original geometry, or restoring force. The restoring force makes it possible to pressurize the center portion, which could not have fully been pressurized by a conventional fastening method simply using the fastening bolts arranged in the outer periphery of the flat-plate-type fastening plate, and makes it possible to uniformly pressurize the entire surface.

The fastening unit 3 is configured so as to make a portion of the pressure plate 31 thrust outwardly from the frame 30. The pressure plate 31 composed of an electro-conductive material has a function of collecting electric power generated by the power generation cell 2. By using the portion of the pressure plate 31 thrust out from the frame 30 as a terminal, it is made possible to extract the electric power for use in external devices. The pressure plate 31 composed of a good heat conductor has also a function of radiating heat generated by the power generation cell 2. By allowing the air to fluidize so as to blow the portion thrust out from the frame 30, it is made possible to cool the power generation cell 2 via the pressure plate 31. The cooling of the power generation cell 2 makes it possible to avoid any nonconformities such as dry-up due to temperature rise in the power generation cell 2. The fastening of the power generation cell 2 with thus-functionalized pressure plate 31 makes it no more necessary for the power generation unit 1 to be separately equipped with any current collector plate or heat radiating plate, and this is successful in reducing the number of components. It is also made possible to thin the power generation unit 1.

The power generation unit 1 is configured, as shown in FIG. 1, as having the power generation cell 2 mounted on the base 22, and as having the fastening unit 3 provided on the power generation cell 2. The fastening unit 3 is, as described in the above, a device capable of applying a uniform fastening pressure, so that the power generation cell 2 fastened by the fastening unit 3 is uniformly pressurized. In other words, it is made possible to uniformly pressurize the joint component 20 and the flow-path-forming component 21 composing the power generation cell 2, and to uniformly pressurize the electrolyte 200 and the electrodes 201, 202 composing the joint component 20. This is successful in solving problems of lowering in the reaction efficiency or degradation of the electric resistance caused by non-uniform pressurizing of the electrolyte 200 and the electrodes 201, 202, by ensuring close contact between the electrolyte 200 and the electrodes 201, 202, and thus-obtained large contact area results a fuel cell having a large power generation efficiency.

It is also allowable to use, in place of the above-described joint component 20 stacked on the power generation cell 2, a joint component sheet configured by providing a diffusion layer, thickened in the center portion thereof as compared with the peripheral portion thereof, to the joint component 20. Holding of the joint component sheet with the flow-path-forming component 21 results in pressurizing of the center portion of the joint component sheet so as to produce repulsive force therein, and the repulsive force makes it possible to pressurize also the center portion of the flow-path-forming component 21. Thus-produced uniform pressurizing force makes it possible to bring the electrodes and electrolyte in the joint component sheet into uniform close contact.

It is also allowable to use two fastening unit 3, for example, so as to hold the power generation cell 2 and the base 22 from both sides thereof, to thereby fasten the power generation cell 2. The fastening of the power generation cell 2 from both sides makes it possible to more uniformly pressurize the power generation cell 2.

Figure 4A:
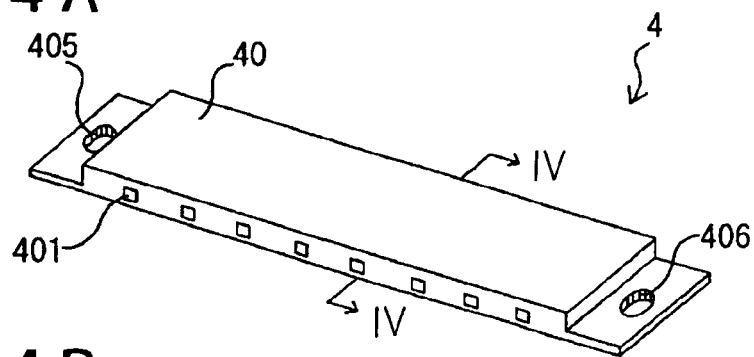
FIGS. 4A-4B are views showing a configuration of a fluid conveyance apparatus, where
Figure 4B:
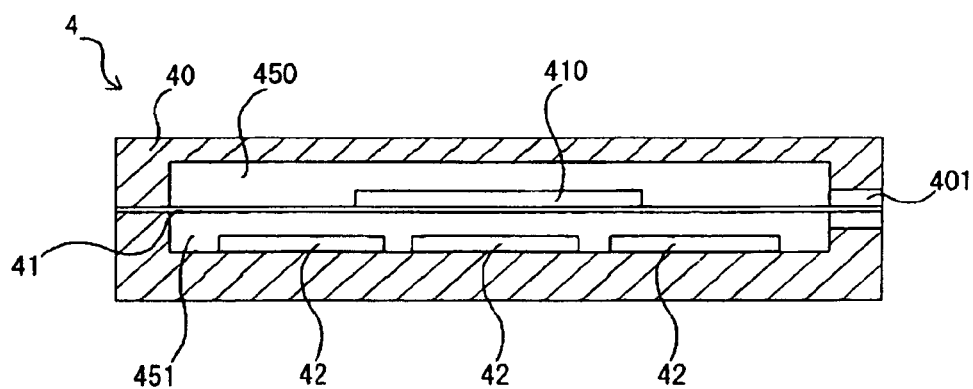

Next paragraphs will describe the fluid conveyance unit 4 mounted to the power generation unit of the present invention. FIG. 4 is a drawing showing a configuration of the fluid conveyance unit 4. FIG. 4A is a drawing showing an outer appearance of the fluid conveyance unit 4, and FIG. 4B is a sectional view taken along line IV-IV in FIG. 4A. The fluid conveyance unit 4 is configured by the housing 40 having openings, as shown in FIG. 4A. The housing 40 has a near-rectangular solid geometry, hollow inside, and has fixture holes 405, 406 allowing attachment of the housing 40 to the base 22, and a plurality of openings 401 on one side face of the housing 40. The housing 40 is composed of a heat-resistant material unlikely to cause deformation by heat generated by the power generation cell 2. The geometry of the housing 40 can appropriately be modified depending on geometry of the required power generation unit 1, and on the number of cells of the power generation cell 2 corresponded to the fluid conveyance unit 4.

The fixture holes 405, 406 are provided at the position corresponded to the fixtures 225, 226 provided on the base 22. The geometry of the fixture holes 405, 406 is not limited to that shown in FIG. 4, but may appropriately be modified depending on the geometry of the base 22, mode of attachment, and so forth. The openings 401 are provided at the position corresponded to that of the oxidant gas flow paths 210 in a state attached to the base 22. The number of openings 401 may appropriately be varied depending on the number of oxidant gas flow paths 210 provided to the flow-path-forming component 21, or on the number of power generation cells 2 provided for a single fluid conveyance unit 4. For an exemplary case where a single fluid conveyance unit 4 is provided to a single power generation cell 2, the number of the openings 401 may be same with that of the oxidant gas flow paths 210 provided to the flow-path-forming component 21 of the power generation cell 2. Geometry and size of the openings 401 are not specifically limited, and may appropriately be modified depending on the size and geometry of the oxidant gas flow paths 21, or on the power generation cell 2 provided to the single fluid conveyance unit 4.

Inside the housing 40, there are provided, as shown in FIG. 4B, the diaphragm 41 partitioning the inner space thereof into a space 450 and a space 451, a flat coil 410 attached on the diaphragm 41, and magnets 42 disposed on the bottom surface of the space opposite to the space having the flat coil 410 disposed therein, while placing the diaphragm 41 in between.

The diaphragm 41 is composed of a thin-film-formed sheet, and partitions the inner space of the housing 40 into two spaces of the space 450 and the space 451. The space 450 and the space 451 are respectively communicated with the external of the housing 40 via the openings 401. The diaphragm 41 has the flat coil 410 disposed on the top surface thereof. The diaphragm 41 oscillates in the vertical direction as described later, so that the diaphragm 41 is composed of a material capable of allowing the vertical oscillation and enduring the oscillation. It is typically composed of butyl rubber or the like.

Figure 5:
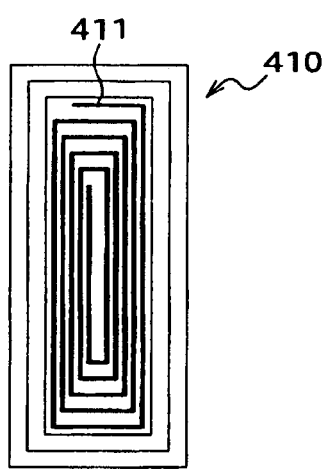
FIG. 5 is a plan view showing geometry of a flat coil.

FIG. 5 is a plan view showing a geometry of the flat coil 410 disposed on the diaphragm 41. The flat coil 410 is configured by winding a lead wire 411 composed of an electro-conductive material from the center toward the outer side, without being stacked, and disposed on the top surface of the diaphragm 41. The end of the lead wire 411 is connected to the external, so as to make it possible to introduce AC current from the external. The AC current may also be such as being obtained by the fuel cell having the flat coil 410 mounted thereon. Geometry of the flat coil 410 may appropriately be modified depending on intensity of the magnetic field to be generated, for example.

The magnets 42 are disposed on the bottom surface of the inner space of the housing 40, opposite to the space having the flat coil 410 disposed therein, while placing the diaphragm 41 in between. The number of the magnets 42 to be disposed is not specifically limited, and may appropriately be altered depending on the geometry, size of the magnet 42, and magnetic intensity.

Figure 6A:
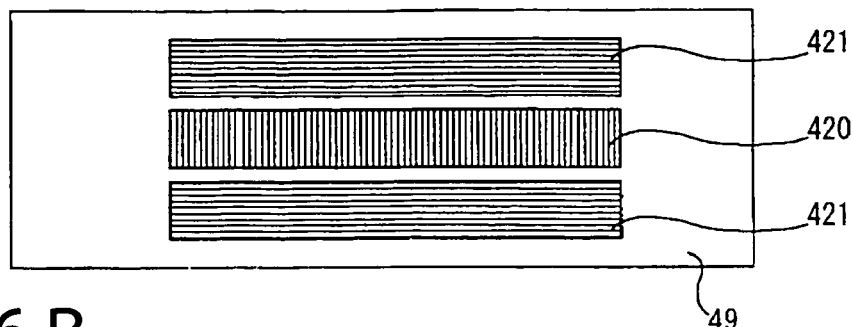
FIGS. 6A-6C are views showing inside of the fluid conveyance apparatus, where
Figure 6B:
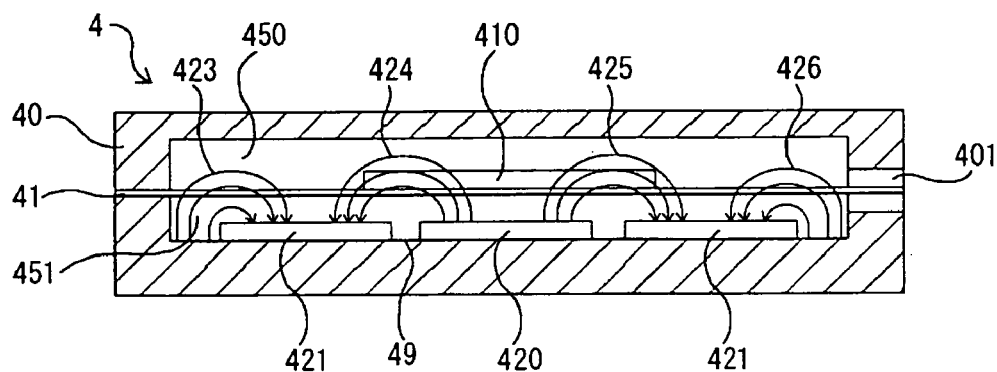

FIG. 6A to FIG. 6D are drawings showing the inside of the fluid conveyance unit 4. The diaphragm 41 resides at the position so as to almost equally divide the space 450 and the space 451. FIG. 6A and FIG. 6B show an exemplary case where a magnet 420 is disposed on the bottom surface 49 inside the fluid conveyance unit 4 and right under the center of the flat coil 410, and magnets 421 having an inverse polarity are disposed on both sides of the magnet 420. This mode of arrangement of the magnet 420 and the magnets 421 results in generation of a magnetic field in the fluid conveyance unit 4. Directions 423, 424, 425 and 426 of the magnetic field are substantially equal to the in-plane direction of the flat coil 410.

Current supply herein to the flat coil 410 generates a vertical electromagnetic force in the flat coil 410 by contribution of an in-plane component of the magnetic field of the flat coil 410 and current in the direction normal thereto. Direction of force of thus-generated electromagnetic force can be inverted depending on the direction of the current supplied to the flat coil 410. This makes it possible to vertically oscillate the diaphragm 41 having the flat coil 410 disposed thereon. In a case where the current is supplied so as to generate downward force in the flat coil 410, the diaphragm 41 having the flat coil 410 disposed thereon is attracted towards the direction of the magnets 420, 421. This forces the air which resides in the space 451 to go out through the opening 401, and conversely, the air outside the fluid conveyance unit 4 flows through the opening 401 into the space 450. The air discharged from the opening 401 and the air which resides around the opening 401 form a mixed vortex excellent in the flow rate and linearity, and thereby the air is pushed out ahead the opening 401.

The fluid conveyance unit 4 can therefore allow the diaphragm 41 to vertically oscillate, by supplying AC current to the flat coil 410, and can vary the volume of the space 450 and the space 451, to thereby intermittently generate a linear mixed vortex ahead the openings 401 of the fluid conveyance unit 4.

Figure 6C:
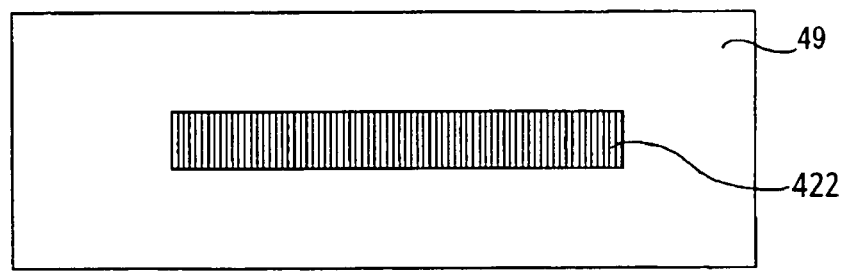
Figure 6D:
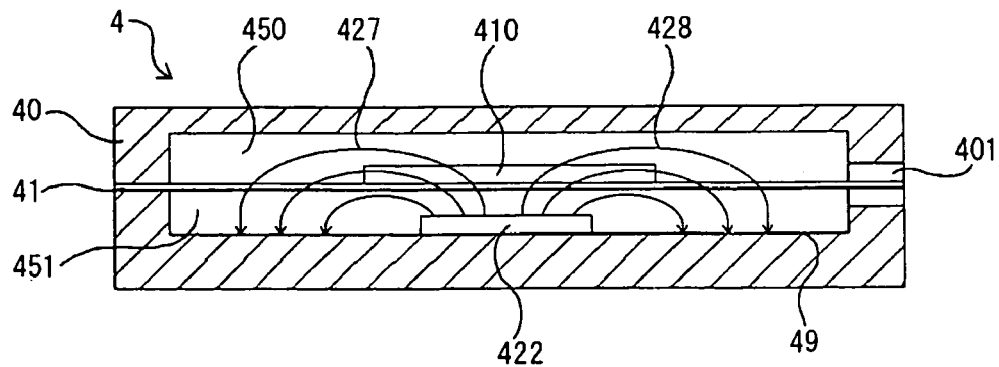
FIG. 6D is a view showing a cross-sectional view of the fluid conveyance apparatus in the case of using the single magnet.

As another example, as shown in FIG. 6C and FIG. 6D, it is also allowable to dispose a magnet 422 on the bottom surface 49 of the space 451, right under the center of the flat coil 410. This mode of arrangement of the magnet 422 results in generation of a magnetic field in the fluid conveyance unit 4. Directions 427, 428 of the magnetic field are substantially equal to the in-plane direction of the flat coil 410. Also this mode of arrangement of the magnet 422 can therefore allow the diaphragm 41 to vertically oscillate, by supplying AC current to the flat coil 410, and can intermittently generate the mixed vortex, similarly to the case where the magnets 420, 421 are arranged as shown in FIG. 6A and FIG. 6B.

Figure 7:
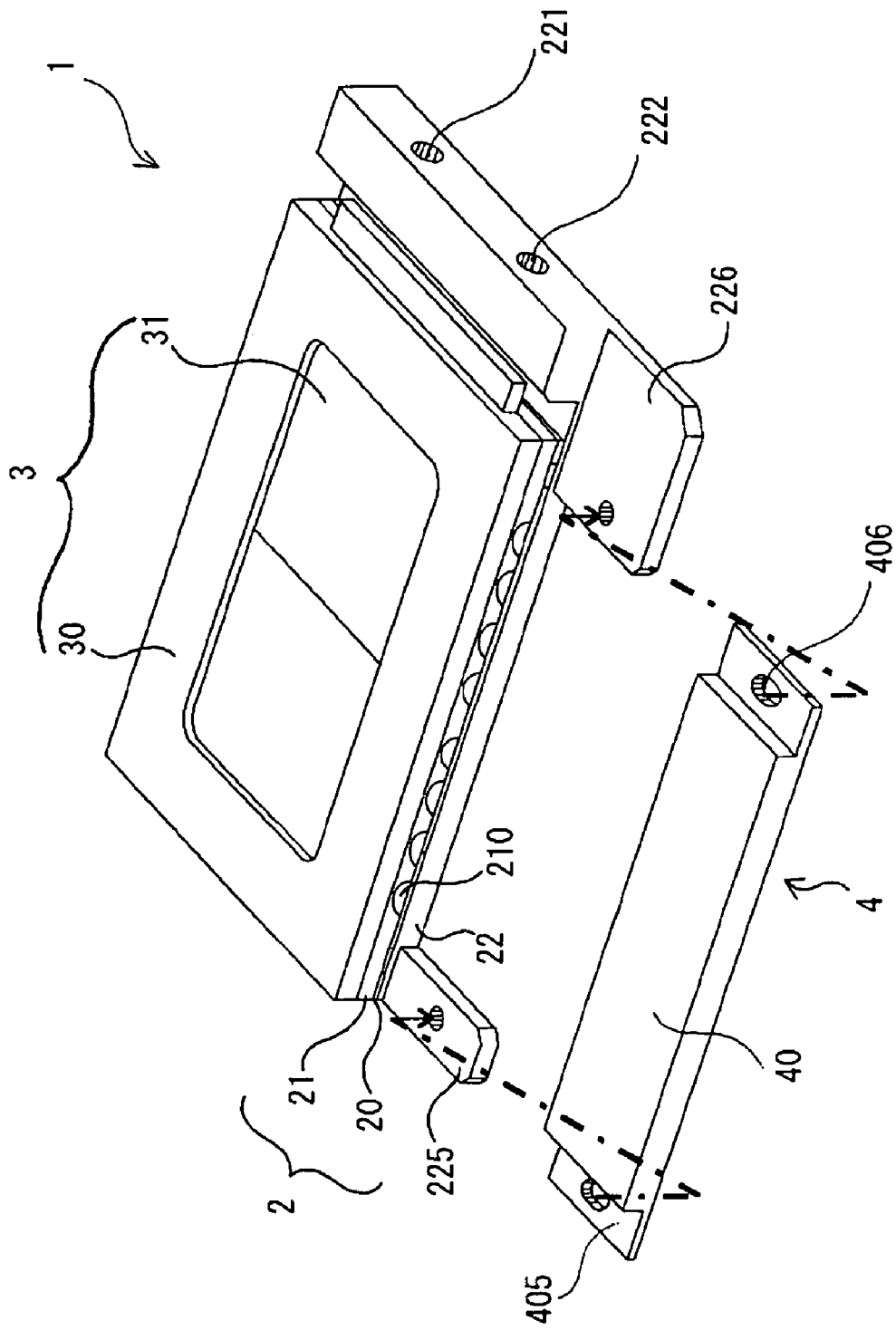
FIG. 7 is a perspective view showing the power generation unit.

The power generation unit 1 can be arranged, as shown in FIG. 7, by attaching the fluid conveyance unit 4 to the base 22, so as to oppose one face of the power generation cell 2 having the opening portions of the oxidant gas flow paths 210 opened therein, with the face of the fluid conveyance unit 4 having the openings 401 opened therein. The mixed vortex discharged from the openings 401 under operation of the fluid conveyance unit 4 flows into the oxidant gas flow path 210 disposed in the vicinity of the openings 401, to thereby supply the air. Volume of the air discharged from the fluid conveyance unit 4 is almost equalized in the individual openings 401. This consequently equalizes the volume of the air supplied to the oxidant gas flow paths 210. In other words, it is made possible to eliminate difference in the air volume among the oxidant gas flow paths 210, and to ensure an effective power generation. It is to be understood herein that the power generation unit 1 is not limited to that configured by using a single power generation cell 2 for a single fluid conveyance unit 4, and may appropriately be altered depending on the geometries of the fluid conveyance unit 4 and the power generation cell 2. For example, the number of the power generation cells 2 may be one for two fluid conveyance units 4, or the number of the power generation cells 2 may be two for a single fluid conveyance unit 4.

The air flowing from the fluid conveyance unit 4 towards the oxidant gas flow paths 210 is discharged from the openings 401 of the fluid conveyance unit 4 in a form of mixed vortex. The mixed vortex is an air flow having a large flow rate and an excellent linearity, such as so-called jet flow, and can pass through narrow flow path, for example. The supply of the mixed vortex to the oxidant gas flow paths 210 can promote mixing of the fluid in the oxidant gas flow paths 210, so as to rapidly mix the air having a reduced oxygen concentration in the vicinity of the joint component 20 and the fresh air introduced from the external and having an oxygen concentration higher than that of the air in the vicinity of the joint component 20, to thereby solve the oxygen shortage in the vicinity of the joint component 20. This is consequently successful in equalizing the oxygen concentration in the flow paths.

Figure 8:
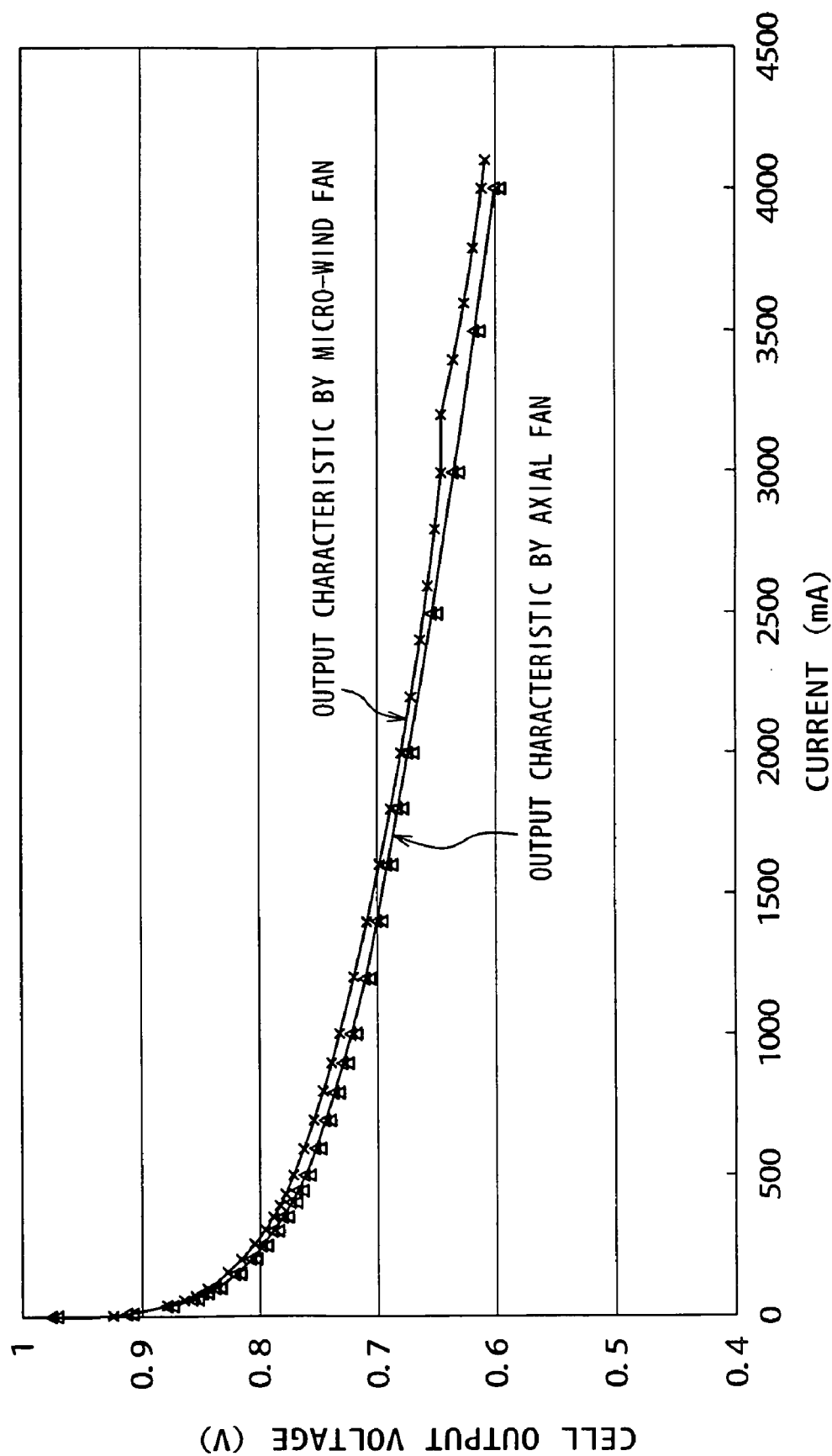
FIG. 8 is a graph showing a measurement result of output performance of the power generation unit.

FIG. 8 shows measured results of an output characteristic of power generation unit 1 using the fluid conveyance unit 4, together with comparative measured results of an output characteristic of a conventionally-adopted fuel cell in which the air is supplied to the oxidant gas flow paths with the aid of an air-supply fan.

As shown in FIG. 8, the power generation unit 1 of the present invention can output voltage higher than the fuel cell using the air supply fan can do. It is therefore obvious that the power generation unit 1 of the present invention is higher than the conventional one in the power generation efficiency.

Figure 9:
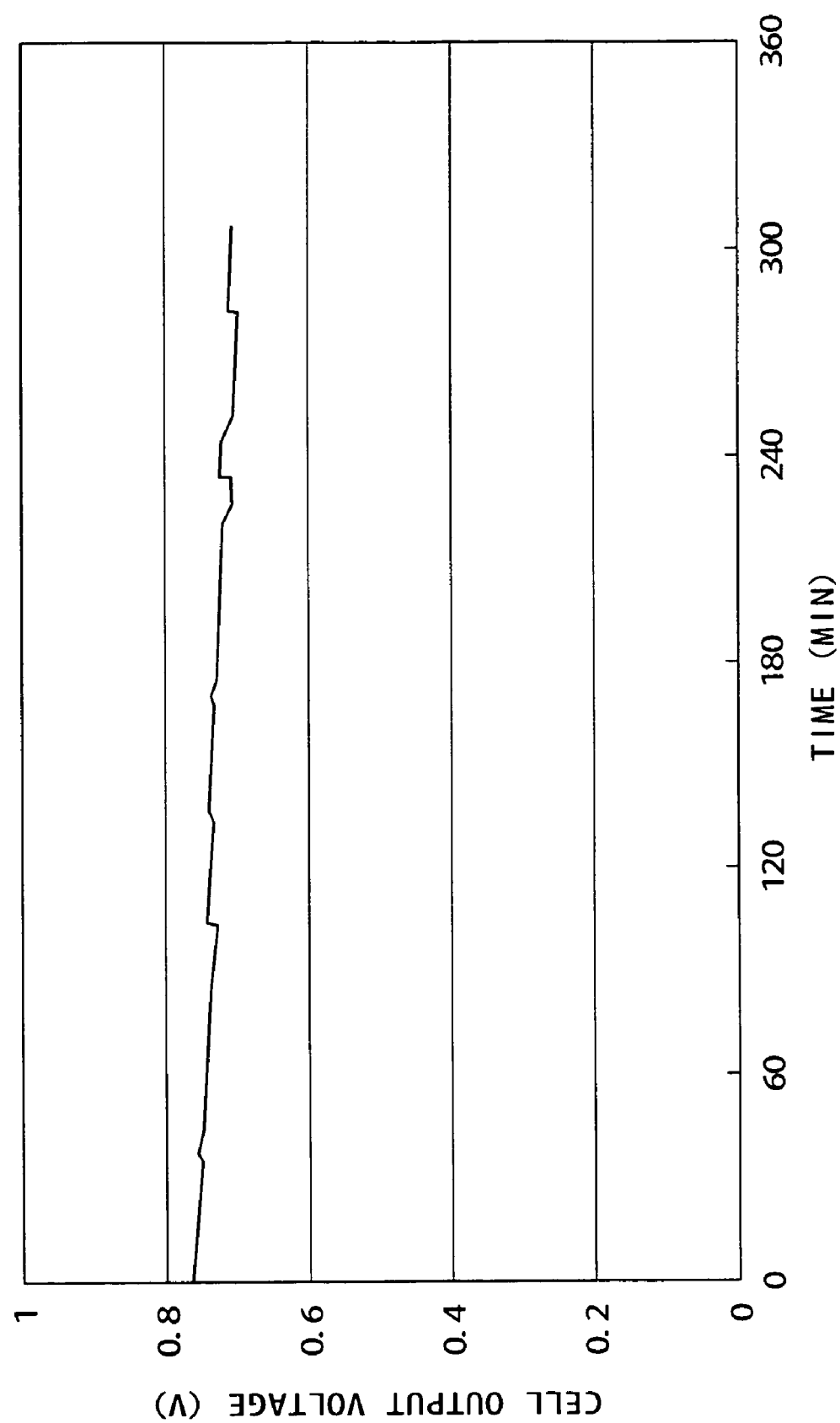
FIG. 9 is a graph showing output voltages of the power generation unit against power generation time.

FIG. 9 is a drawing showing changes in the output voltage of the power generation unit 1 of the present invention with respect to power generation time. As is obvious from FIG. 9, a nearly constant output voltage can be obtained over a long power generation time, proving stable power generation.

It is all enough that the fluid conveyance unit 4 generating a high-linearity mixed vortex is arranged on an extended line of the oxidant gas flow paths 210, and is not always necessarily be disposed in the close vicinity of the oxidant gas flow paths 210. This makes it possible to improve degree of freedom of the arrangement of the power generation unit 1.

Next paragraphs will describe power generation processes of the power generation unit 1 in the present embodiment. Hydrogen is supplied, typically using a hydrogen absorption cartridge, via the fuel gas supply port 221 to the fuel gas flow path 220. On the other hand, the air is supplied to the oxidant gas flow paths 210 under operation of the fluid conveyance unit 4. This results in hydrogen supply to the surface of the joint component 20 in contact with the fuel gas flow path 220, and air supply to the opposite surface. With thus-supplied hydrogen and air, a reaction of $H_2 \rightarrow 2H^+ + 2e^-$ proceeds at the interface between the electrolyte 200 and the electrode 201, and a reaction of $(½)O_2 + 2H^+ + 2e^- \rightarrow H_2O$ proceeds at the interface between the electrolyte 200 and the electrode 202. The reaction which proceeds at the interface of the electrolyte 200 and the electrode 201 generates an electron and a proton ($H^+$), and the electron moves from the electrode 201 through an external circuit towards the electrode 202, and the proton passes through the electrolyte 200 to reach the electrode 202. At the interface between the electrolyte 200 and the electrode 202, the electron and the proton coming thereto and oxygen in the supplied air react to produce water. As is known from the above, the power generation cell unit 1 of the present invention can generate power if hydrogen is supplied to the fuel gas flow path 220, and the air is supplied to the oxidant gas flow paths 210, respectively.

As described in the above, the power generation reaction proceeds using thus-supplied hydrogen and air, at the interface between the electrolyte 200 and the electrode 201, and at the interface between the electrolyte 200 and the electrode 202. It is therefore necessary, for an efficient power generation, to equalize volume of the air to be supplied to the flow paths. The fluid conveyance unit 4 in the present invention can eliminate difference in the air flow rate among the flow paths. The air allowed to flow by the fluid conveyance unit 4 is a mixed vortex with a high linearity, and makes it possible to equalize the oxygen concentration in the flow paths through mixing of the air in the oxidant gas flow paths 210. These effects make the power generation efficient.

The oxidant gas flow paths 210 of the flow-path-forming component 21 have the opening portions 211, 212 such as being tapered so as to widen the sectional area than that of the center portion of the flow path, and have rounded corners, so as to reduce the air flow resistance, and to increase the flow rate of the air through the oxidant gas flow paths 210. This makes it possible to smoothly supply oxygen to the oxidant gas flow paths 210 even when they are narrowed, for example, as a result of thinning of the flow-path-forming component 21.

The power generation unit 1 also adopts the fastening unit 3 making use of repulsive force of the pressure plate 31, so as to say a flat spring. The fastening unit 3 can therefore uniformly pressurize the power generation cell 2. In other words, a uniform and close contact of the electrodes 201, 202 with the electrolyte 200 can solve a problem of lowering in the reaction efficiency and degradation of the electric resistance, can ensure a large contact area, and can improve the power generation efficiency.

The base also functions as an anode current collector. The pressure plate 31 of the fastening unit 3 has a function of collecting the generated power, or of radiating heat generated by the power generation. It is, therefore, no more necessary to separately mount an anode current collector, a cathode current collector nor a heat radiator plate on the power generation cell 2, and the number of components can be reduced. It is also made possible to thin the power generation unit 1.

The foregoing description has been made on the embodiment regarding the power generation unit 1 of the present invention. The fuel gas and the oxidant gas used in the present embodiment are not limited to hydrogen and air, respectively, and it is also allowable to use other fuel gas and oxidant gas used in the general fuel cells.

Next paragraphs will describe an embodiment of the fuel cell of the present invention. The power generation unit 1 can keep a constant flow rate of the air supplied to the individual oxidant gas flow paths 210, by virtue of mounting of the fluid conveyance unit 4, and can ensure an effective power generation. It is therefore made possible to fabricate the fuel cell by arranging the power generation units 1, as a constitutional unit, so as to meet a required power generation capacity, without need of re-optimizing motion and volume of the fluid within the fuel cell.

The fuel cell of the present invention can be exemplified by a stacked fuel cell 60 configured by making correspondence between a single fluid conveyance unit 4 and a single power generation cell 2, and by stacking them in a plural number, and a flat fuel cell 61 configured by arranging a plurality of power generation units 1, each of which composed of a single fluid conveyance unit 4 and a single power generation cell 2, in a two-dimensional manner.

Figure 10:
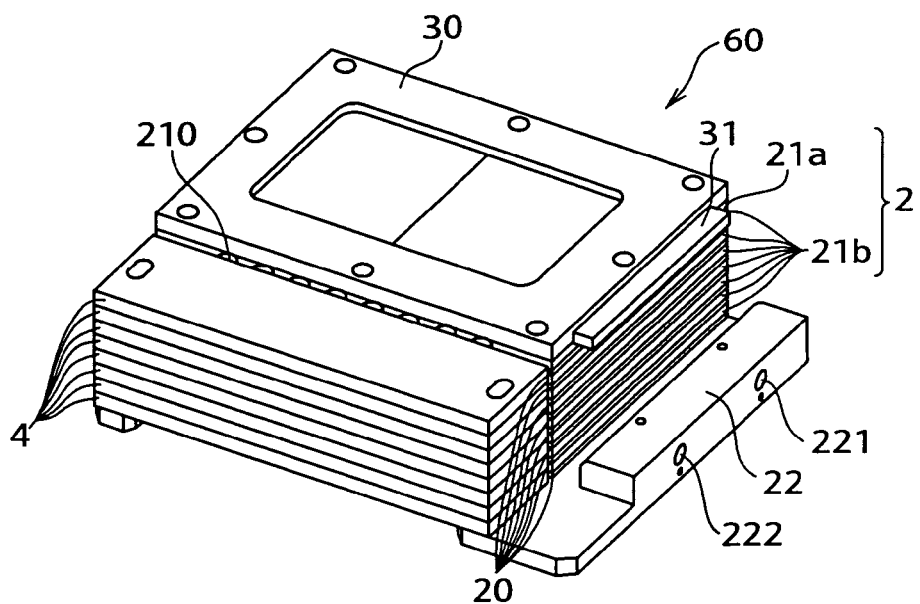
FIG. 10 is a perspective view showing a stacked fuel cell.

FIG. 10 is a perspective view showing the stacked fuel cell 60. The stacked fuel cell 60 is configured by making correspondence between a single fluid conveyance unit 4 and a single power generation cell 2, and by stacking them in a plural number. The flow rates of the air discharged from the individual openings 401 of the fluid conveyance units 4 are almost equal, and this equalizes the flow rates of the air through the individual oxidant gas flow paths 210 of the power generation cell 2. It is therefore made possible to construct a fuel cell having a desired power generation capacity, simply by stacking the power generation cells 2 and the fluid conveyance units 4, without need of re-equalization of the air flow rate. The stacked fuel cell 60 has no special limitation on the number of cells to be stacked, and allows any design adaptive to required power generation capacity.

Figure 11:
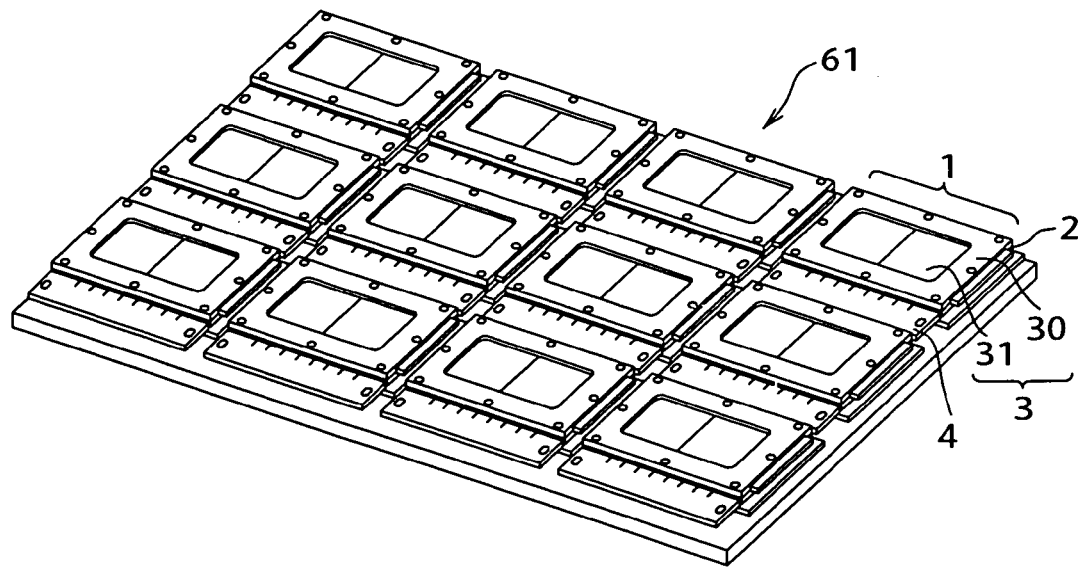
FIG. 11 is a perspective view showing a flat fuel cell.
Figure 12:
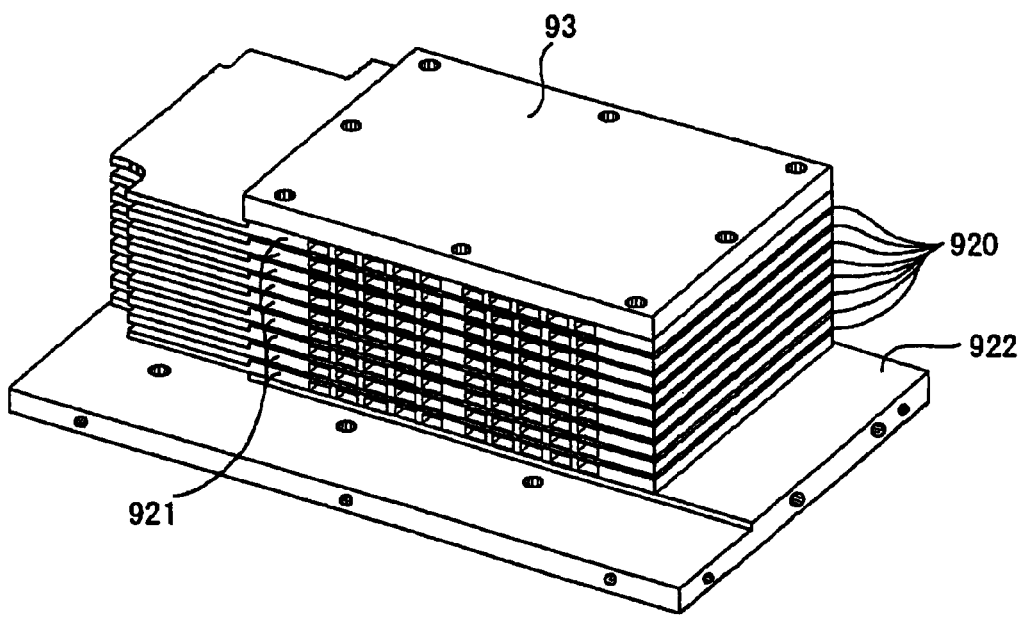
FIG. 12 is a perspective view showing a conventional stacked fuel cell.

FIG. 11 is a perspective view showing a flat fuel cell 61. The flat fuel cell 61 is configured by arranging the power generation units 1, each of which comprising a single fluid conveyance unit 4 and a single power generation cell 2, and by arranging them in a 3-line-4-row matrix. The flow rates of the air flowing through the individual power generation units 1 are equalized within each power generation unit 1. It is therefore made possible to construct a fuel cell having a desired power generation capacity simply by two-dimensional arrangement, without need of re-equalization of the air flow rate. The arrangement of the power generation units 1 as shown in FIG. 11 also makes it possible to construct a thin fuel cell. The power generation units 1 may be electrically independent in the flat fuel cell 61. The independent configuration of the power generation units 1 makes it possible to arbitrarily arrange the individual power generation units 1 in series or in parallel. It is made also possible to switch over the individual power generation units 1 as required so as to vary the output voltage, to thereby obtain various levels of output voltage from a single fuel cell.

Fastening of the power generation unit 1 may be effected, as shown in FIG. 11, by attaching the fastening unit 3 to the power generation cell 2, so as to fasten the power generation units 1 one by one, but it is also allowable to two-dimensionally arrange the power generation units 1, and to fasten these power generation units 1 en bloc down from the upper side using a single fastening plate. For example, it is possible to dispose the two-dimensionally-arranged power generation units 1 under a target instrument, and to fasten the individual power generation units 1 en bloc using the bottom surface of the instrument as a fastening plate. The arrangement of the power generation units 1 in the two-dimensionally-arranged fuel cell 61 is not limited to the 3-line-4-row matrix, but may appropriately be modified depending on the number of power generation units 1, number of cells and so forth, depending on the fuel cell to be designed or on the geometry of the target instrument. The power generation units 1 may be disposed in any available space in the circuits of the target instrument.

As has been described in the above, the fuel cell of the present invention is formed using the power generation unit 1 as a constitutional unit. Because the air flow rates in the individual oxidant gas flow paths 210 are equalized, the power generation unit 1 can successfully construct a fuel cell having a desired power generation capacity, simply by stacking the power generation cells 2, or by arranging the power generation units 1 in a two-dimensional manner, without need of re-equalization of the air flow rate. That is, the fuel cell of the present invention can flexibly be designed depending on required power generation capacity and geometry.

What is claimed is:

1. A power generation unit, comprising:

a power generation cell which is composed of a joint component of a pair of electrodes and an electrolyte component held between the electrodes, a flow path forming component having a flow path allowing a fluid supplied to the joint component to flow therethrough, a fastening unit comprising a frame and a base, wherein the power generation cell is held between said base and frame, and a pressure plate attached to the frame to press the power generation cell;

a fluid conveyance apparatus having an opening commonly functioning as an intake port and a discharge port of the fluid, and discharging the fluid into the flow path, wherein said fluid conveyance apparatus has a housing having at least one of said opening, and a diaphragm which divides inside of said housing into a first space and a second space, and wherein said first space and said second space both directly communicate with an external portion of said housing via said opening, and wherein said diaphragm also oscillates, a mixed vortex is formed with fluid inside of said housing discharged from said opening and fluid around said opening by oscillation of said diaphragm, and said mixed vortex is discharged to front of said opening.

2. The power generation unit as claimed in claim 1, wherein:

a number of openings of said fluid conveyance apparatus is equal to a number of flow paths allowing a fluid supplied to the joint component to flow therethrough.

3. The power generation unit as claimed in claim 1, wherein said flow path is tapered so that a sectional area of the flow path is greater toward a first opening portion for introducing said fluid and a second opening portion for discharging the fluid than a sectional area at a portion of the flow path at a center portion of the flow path.

4. The power generation unit as claimed in claim 1, wherein said flow path has a substantially semicircular cross-section.

5. The power generation unit as claimed in claim 1, wherein said fastening unit is composed of a heat conductive material.

6. The power generation unit as claimed in claim 1, wherein a number of said power generation cell is one for one of said fluid conveyance apparatus.

7. The power generation unit as claimed in claim 1, wherein a plurality of said power generation cells are stacked.

8. The power generation unit as claimed in claim 1, wherein said fastening unit is composed of an electro-conductive material.

9. The power generation unit as claimed in claim 8, wherein said electro-conductive material is phosphor bronze or stainless steel.

10. A fuel cell having a power generation unit, said power generation unit comprising:

a joint component of a power generation cell which is composed of a pair of electrodes and an electrolyte held between the electrodes, a flow path forming component allowing a fluid supplied to the joint component to flow therethrough, a fastening unit comprising a frame and a base, wherein the power generation cell is held between said base and frame, and a pressure plate attached to the frame to press the power generation cell, being composed of an electro-conductive material; and a fluid conveyance apparatus having an opening commonly functioning as an intake port and a discharge port of the fluid, and discharging the fluid into the flow path, wherein said fluid conveyance apparatus has a housing having at least one of said opening, and a diaphragm which divides inside of said housing into a first space and a second space, and wherein said first space and said second space both directly communicate with an external portion of said housing via said opening, and wherein said diaphragm also oscillates, a mixed vortex is formed with fluid inside of said housing discharged from said opening and fluid around said opening by oscillation of said diaphragm, and said mixed vortex is discharged to front of said opening.

11. A circuit of electronic equipment having a fuel cell having a power generation unit of claim 10 disposed in an available space in said circuit, said electronic equipment driven by power generated in the power generation unit.

12. The circuit of electronic equipment of claim 11, wherein said power generation unit is arranged in a side-by-side manner.

* * * * *